United States Patent
Schmitt et al.

(10) Patent No.: US 11,237,936 B2
(45) Date of Patent: Feb. 1, 2022

(54) SECURE SYSTEM DATA COLLECTION USING CALL HOME FEATURE

(71) Applicant: International Business Machines Corporation, Armonk, NY (US)

(72) Inventors: Christof Schmitt, Tucson, AZ (US); Stefan Lehmann, Tucson, AZ (US); Erik Rueger, Ockenheim (DE); Ole Asmussen, Henstedt-Ulzburg (DE)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 16/101,476

(22) Filed: Aug. 12, 2018

(65) Prior Publication Data

US 2020/0050524 A1 Feb. 13, 2020

(51) Int. Cl.
*G06F 11/30* (2006.01)
*H04L 29/06* (2006.01)
*G06F 11/22* (2006.01)
*G06F 11/07* (2006.01)

(52) U.S. Cl.
CPC ...... *G06F 11/3065* (2013.01); *G06F 11/0784* (2013.01); *G06F 11/2268* (2013.01); *H04L 63/08* (2013.01)

(58) Field of Classification Search
CPC ............ G06F 11/3065; G06F 11/0784; G06F 11/2268; H04L 63/08
See application file for complete search history.

(56) References Cited

U.S. PATENT DOCUMENTS

| | | | |
|---|---|---|---|
| 5,321,837 A | 6/1994 | Daniel et al. | |
| 6,338,152 B1 | 1/2002 | Fera et al. | |
| 6,651,034 B1 | 11/2003 | Hedlund et al. | |
| 6,985,944 B2* | 1/2006 | Aggarwal | H04L 41/069 707/999.003 |
| 7,624,265 B1* | 11/2009 | Slyva | H04L 63/08 713/168 |
| 9,307,067 B2* | 4/2016 | Debates | G06F 8/65 |
| 9,317,355 B2* | 4/2016 | Ahrens | G06F 11/0769 |

(Continued)

OTHER PUBLICATIONS

Alves, L.C., et al. "RAS design for the IBM eServer z900," IBM Journal of Research and Development, vol. 46, No. 4/5, pp. 503-521, Jul. 2002.

(Continued)

*Primary Examiner* — S M A Rahman
(74) *Attorney, Agent, or Firm* — Nelson IP; Daniel P. Nelson

(57) ABSTRACT

A method to securely collect diagnostic information from an IT product is disclosed. In one embodiment, such a method includes contacting, by an IT product, an external service provider. Upon contacting the external service provider, the IT product checks a database of the external service provider to determine if diagnostic information associated with the IT product needs to be collected. If diagnostic information needs to be collected, an authorization request is sent to an administrator of the IT product. If the authorization request is approved, the IT product collects the diagnostic information and transmits the diagnostic information to the external service provider. A corresponding system and computer program product are also disclosed.

20 Claims, 6 Drawing Sheets

(56) References Cited

U.S. PATENT DOCUMENTS

| | | | |
|---|---|---|---|
| 9,678,802 B2 | 6/2017 | Dain et al. | |
| 2002/0183866 A1 | 12/2002 | Dean et al. | |
| 2003/0191992 A1* | 10/2003 | Kaminsky | G06F 11/0727 |
| | | | 714/712 |
| 2003/0220768 A1* | 11/2003 | Perry | H04L 29/06 |
| | | | 702/188 |
| 2005/0125489 A1* | 6/2005 | Hanes | G06F 8/60 |
| | | | 709/202 |
| 2006/0229896 A1* | 10/2006 | Rosen | G06Q 10/1053 |
| | | | 705/321 |
| 2013/0074185 A1* | 3/2013 | McDougal | G06F 21/561 |
| | | | 726/24 |
| 2016/0179838 A1* | 6/2016 | Mavinakuli | G06F 16/176 |
| | | | 707/618 |

OTHER PUBLICATIONS

Dufrasne, Bert, et al., "IBM XIV Storage System Architecture and Implementation," IBM Redbook, May 2014.

* cited by examiner

400

| Customer Name | Unique ID | Firmware Level | Log File to be Collected |
|---|---|---|---|
| Customer 1 | Product 12-12345 | 1.2.3.4 | Logfile.special |
| Customer 2 | Product 67-12345 | 2.3.4.5 | Special.logfile |
| Customer 3 | Product abc.defg | 5.4 | Collect.logfile |

Fig. 4

SECURE SYSTEM DATA COLLECTION USING CALL HOME FEATURE

BACKGROUND

Field of the Invention

This invention relates to systems and methods for securely collecting diagnostic information.

Background of the Invention

Most available information technology (IT) products provide functionality for sending system logs to vendors of the products. This enables vendors to debug problems associated with the IT products in the immediate or short term, as well as analyze and gather statistics associated with the IT products over the long term to improve the products. In IBM-related products, this functionality is generally referred to as the "Call Home" service. More specifically, the Call Home service is an automated notification function that detects problem conditions on IBM or related products and reports them to IBM support personnel.

The Call Home service utilizes an outbound data connection from a customer network infrastructure perspective. This means that all data that is sent using the Call Home service is sent from an IT product in a customer datacenter to an external data store of an IT vendor, such as the IBM support network. Due to resource and other constraints, such as data size, time, and network bandwidth, it is not always possible to include all potentially significant log files in a default data collection associated with a Call Home event. Thus, various types of information that may be helpful to diagnose a problem may not be automatically transmitted to an IT vendor by the Call Home function.

When needed information is not received in association with the Call Home function, remote support personnel may need to remotely connect to the IT product in order to gather additional data files necessary for analysis and problem resolution. This process is commonly referred to as "Remote Access." Unlike the Call Home feature, which is an outbound process, Remote Access is typically characterized as an inbound process, regardless of the actual flow of data and/or network session initiation. In certain cases, Remote Access to the IT product may not be allowed due to security concerns, thereby making it difficult or impossible to gather necessary additional information.

In view of the foregoing, what are needed are systems and methods to leverage the Call Home feature to gather necessary additional diagnostic information. Ideally, this may be accomplished even in cases where Remote Access is not authorized.

SUMMARY

The invention has been developed in response to the present state of the art and, in particular, in response to the problems and needs in the art that have not yet been fully solved by currently available systems and methods. Accordingly, systems and methods have been developed to securely collect diagnostic information from IT products. The features and advantages of the invention will become more fully apparent from the following description and appended claims, or may be learned by practice of the invention as set forth hereinafter.

Consistent with the foregoing, a method to securely collect diagnostic information from an IT product is disclosed. In one embodiment, such a method includes contacting, by an IT product, an external service provider. Upon contacting the external service provider, the IT product checks a database of the external service provider to determine if diagnostic information associated with the IT product needs to be collected. If diagnostic information needs to be collected, an authorization request is sent to an administrator of the IT product. If the authorization request is approved, the IT product collects the diagnostic information and transmits the diagnostic information to the external service provider.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIG. 4 is a high-level block diagram showing exemplary contents of a database associated with an external service provider;

DETAILED DESCRIPTION

Figure 1:
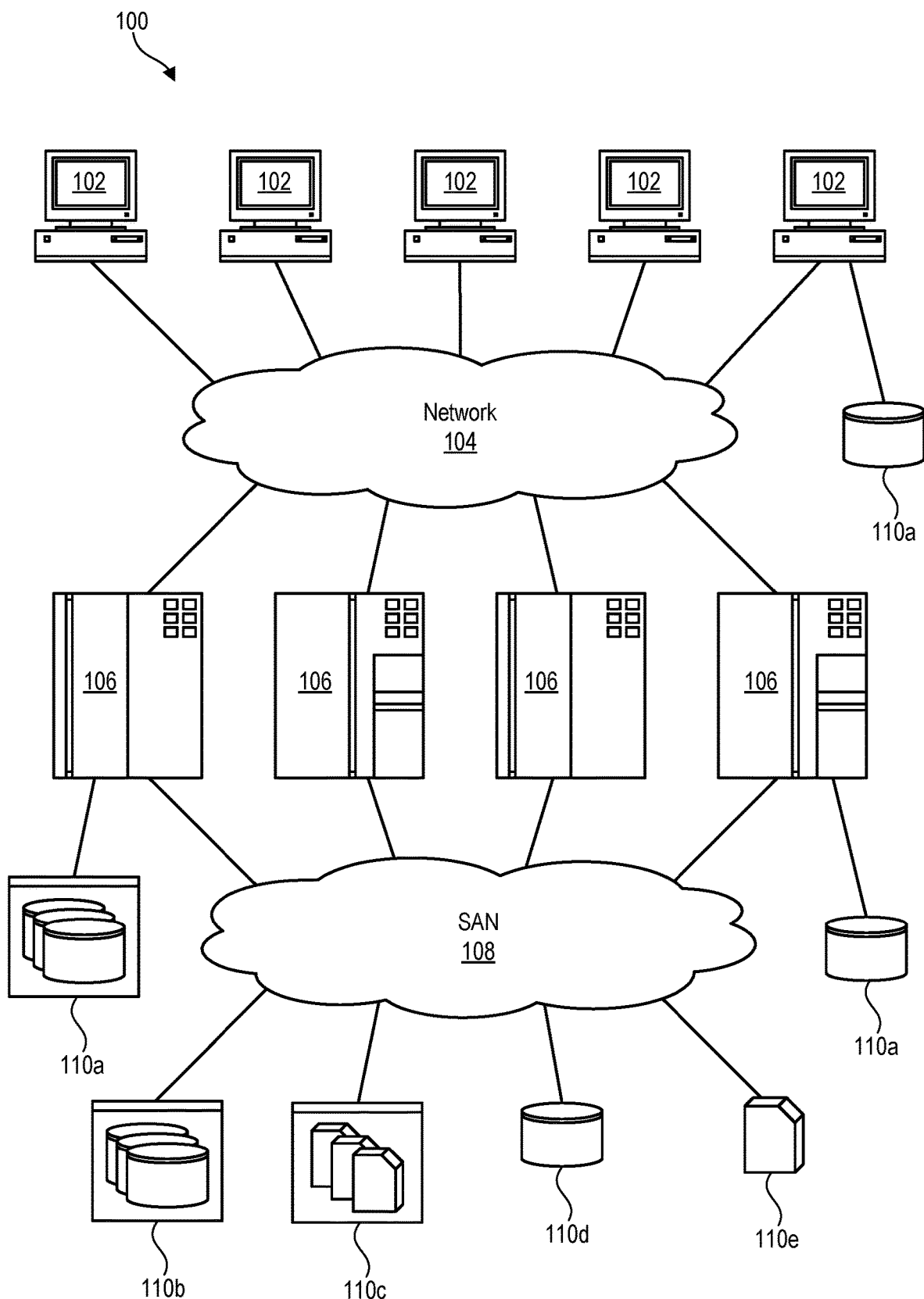
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, virtual tape systems, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
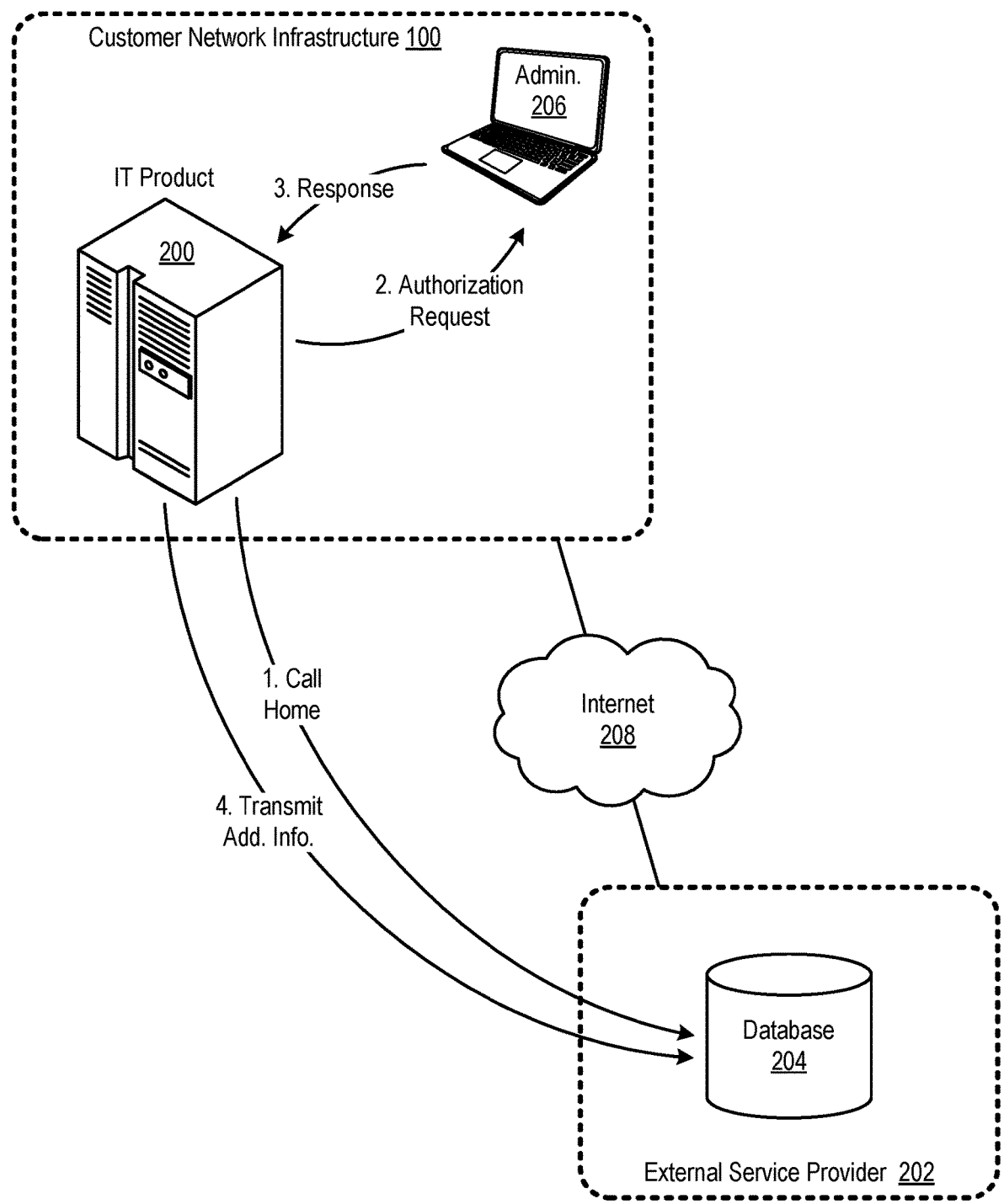
FIG. 2 is a high-level block diagram showing a first embodiment of a process for securely collecting diagnostic information from an IT product.

Referring to FIG. 2, as previously mentioned, most available information technology (IT) products 200 (e.g., hardware servers 106, storage products 110, software solutions, etc.) provide functionality for sending diagnostic information such as system logs to external service providers 202 such as vendors of the products 200. This may occur over a network 208 such as the Internet. This enables external service providers 202 to debug problems associated with the IT products 200 in the immediate or short term, as well as analyze and gather statistics associated with the IT products 200 over the long term to improve the products 200. In IBM-related products, this functionality is generally referred to as the "Call Home" service. More specifically, the Call Home service is an automated notification function that detects problem conditions on IBM or related products 200 and reports them to IBM support personnel.

The Call Home service utilizes an outbound data connection from the perspective of a customer network infrastructure 100. This means that all data that is sent using the Call Home service is sent from an IT product 200 in a customer datacenter to an external data store 204 of the IT vendor, such as the IBM support network. Due to resource and other constraints, such as data size, time, and network bandwidth, it is not always possible to include all potentially significant log files in a default data collection associated with a Call Home event. Thus, various types of information that may be helpful to diagnose a problem may not be automatically transmitted to the external service provider 202 by the Call Home function.

When needed information is not received in association with a Call Home event, the external service provider 202 may need to remotely connect to the IT product 200 in order to gather additional data files necessary for analysis and problem resolution. This process is commonly referred to as "Remote Access." Unlike the Call Home function which is an outbound process, Remote Access is typically characterized as an inbound process, regardless of the actual flow of data and/or network session initiation. In certain cases, Remote Access to the IT product 200 may not be allowed due to security concerns, thereby making it difficult or impossible to gather the necessary additional diagnostic information. In view of the foregoing, it would be advantageous to provide systems and methods to leverage a Call Home or similar feature to gather necessary additional diagnostic information, particularly in situations where Remote Access is not authorized.

FIG. 2 is a high-level block diagram showing one embodiment of a process for securely collecting diagnostic information from an IT product 200. This technique leverages a Call Home or similar outbound feature to gather necessary additional diagnostic information, without requiring Remote Access or other inbound processes. In the illustrated diagram, events and actions are numbered to show their possible sequence. For the purpose of this disclosure, the "Call Home" terminology will be used to refer to the IBM service as well as other analogous or similar services offered by or in association with other IT products 200.

As shown in FIG. 2, when an IT product 200 experiences a problem or issue, the IT product 200 may perform a Call Home or similar function to an external service provider 202 to notify the external service provider 202 of the problem or issue and to send diagnostic information thereto. In certain embodiments, the Call Home may be accompanied by a default set of diagnostic information (e.g., system logs, etc.) that may provide context to the problem or issue on the IT product 200. In certain embodiments, this default diagnostic information may be limited in size so as not to overburden the external service provider 202 with unwanted or unnecessary information, as well as preserve resources such as storage, processing time, and/or bandwidth. This default diagnostic information may be saved in a database 204 of the external service provider 202 under or in association with a unique identifier (ID) of the IT product 200.

In addition to saving default diagnostic information, the IT product 200 may check the database 204 to determine if additional diagnostic information (e.g., log information, etc.) is requested for collection from the IT product 200. This may be saved under the unique identifier associated with the IT product 200. If additional diagnostic information is requested, the IT product 200 may transmit an authorization request to an administrator 206 associated with the IT product 200 that requests authorization to transmit the additional diagnostic information. In certain embodiments, the authorization request may identify the additional diagnostic information that needs to be collected, as well as potentially the problem or issue that would warrant collecting the additional diagnostic information. In certain embodiments, the IT product 200 may begin collecting the additional diagnostic information at the time of sending the authorization request and/or before the authorization request is approved.

If the authorization request is ultimately approved, the IT product 200 may send the additional confidential information to the external service provider 202. In certain embodiments, this may be performed as part of the original Call Home operation or as part of a new Call Home operation to the external service provider 202. This additional diagnostic information may be saved in the database 204 of the external service provider 202 under the unique identifier associated with the IT product 200. By using a Call Home operation to initiate gathering of additional diagnostic information, the need for inbound communications from the external service provider 202 to the IT product 200 may be reduced or eliminated. All communication may be initiated by the IT product 200, which is considered to be outbound. This technique also requires little if any action from the external service provider 202 other than inserting data request entries into the database 204. The data request entries may request diagnostic information that is tailored to the specific IT product 200. Data security is also maintained in that authorization is still required from an administrator 206 associated with the customer prior to sending the additional diagnostic information to the external service provider 202.

Figure 3:
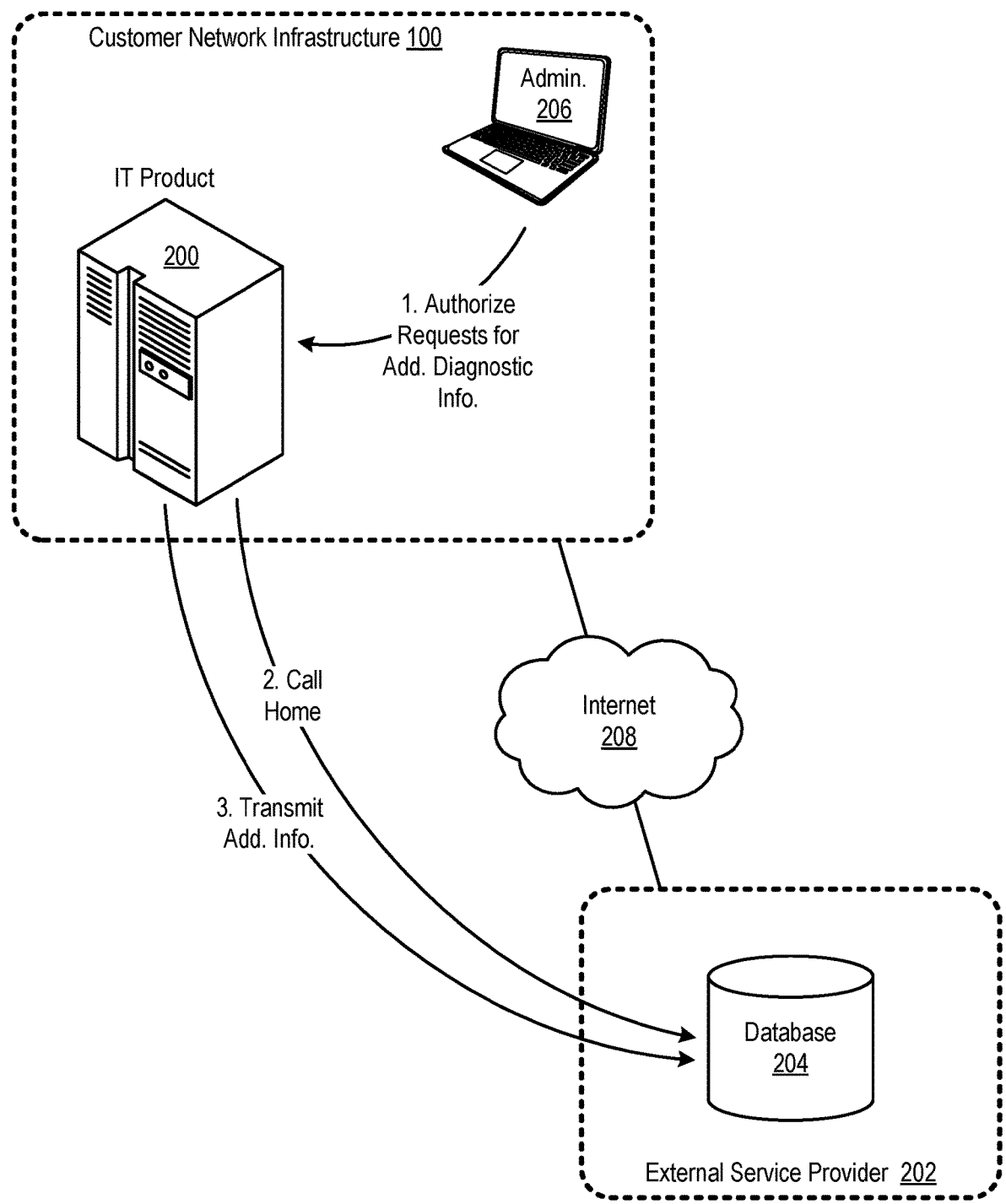
FIG. 3 is a high-level block diagram showing a second embodiment of a process for securely collecting diagnostic information from an IT product.

Referring to FIG. 3, alternatively, instead of requiring authorization from an administrator 206 after an initial Call Home operation, systems and methods in accordance with the invention may enable an administrator 206 to authorize requests for additional diagnostic information before it is actually needed or required. For example, if an administrator 206 trusts requests from a particular external service provider 202, the administrator 206 may authorize the fulfillment of such requests from the external service provider 202 prior to the need for information. In such situations, when the IT product 200 performs a Call Home operation, the IT product 200 may check the database 204 to determine if any additional diagnostic information is required for the particular IT product 200. If additional diagnostic information is required, the IT product 200 may collect the diagnostic information and transmit it to the external service provider 202 without requiring any further authorization from the administrator 206.

Referring to FIG. 4, one example of a database table 400 for use in the database 204 is illustrated. In the exemplary embodiment, the database table 400 includes columns for customer name, unique identifier associated with an IT product 200 of the customer, firmware level of the IT product 200, and particular log file to be collected for the IT product 200. In certain embodiments, the firmware level may indicate whether a particular IT product 200 has the additional diagnostic information to be collected. In certain embodiments, a "command to execute" column (not shown) may be added to the database table 400. This column may designate a command that may be executed on the IT product 200 to collect desired additional diagnostic information.

The content of the database table 400 is presented by way of example and not limitation. Other formats and content are possible and within the scope of the invention. For example, in certain embodiments, the database table 400 may include information about log files to collect or commands to execute for specific problems occurring on an IT product 200. This may allow collected information to be tailored to specific problems or issues. When an IT product 200 performs a Call Home operation, the IT product 200 may check the database 204 for the unique identifier associated with the IT product 200 against the problem or issue that was detected on the IT product 200. If additional diagnostic information is required for the specific problem or issue, the IT product 200 may collect the diagnostic information and send it to the external service provider 202, assuming authorization is received.

Figure 5:
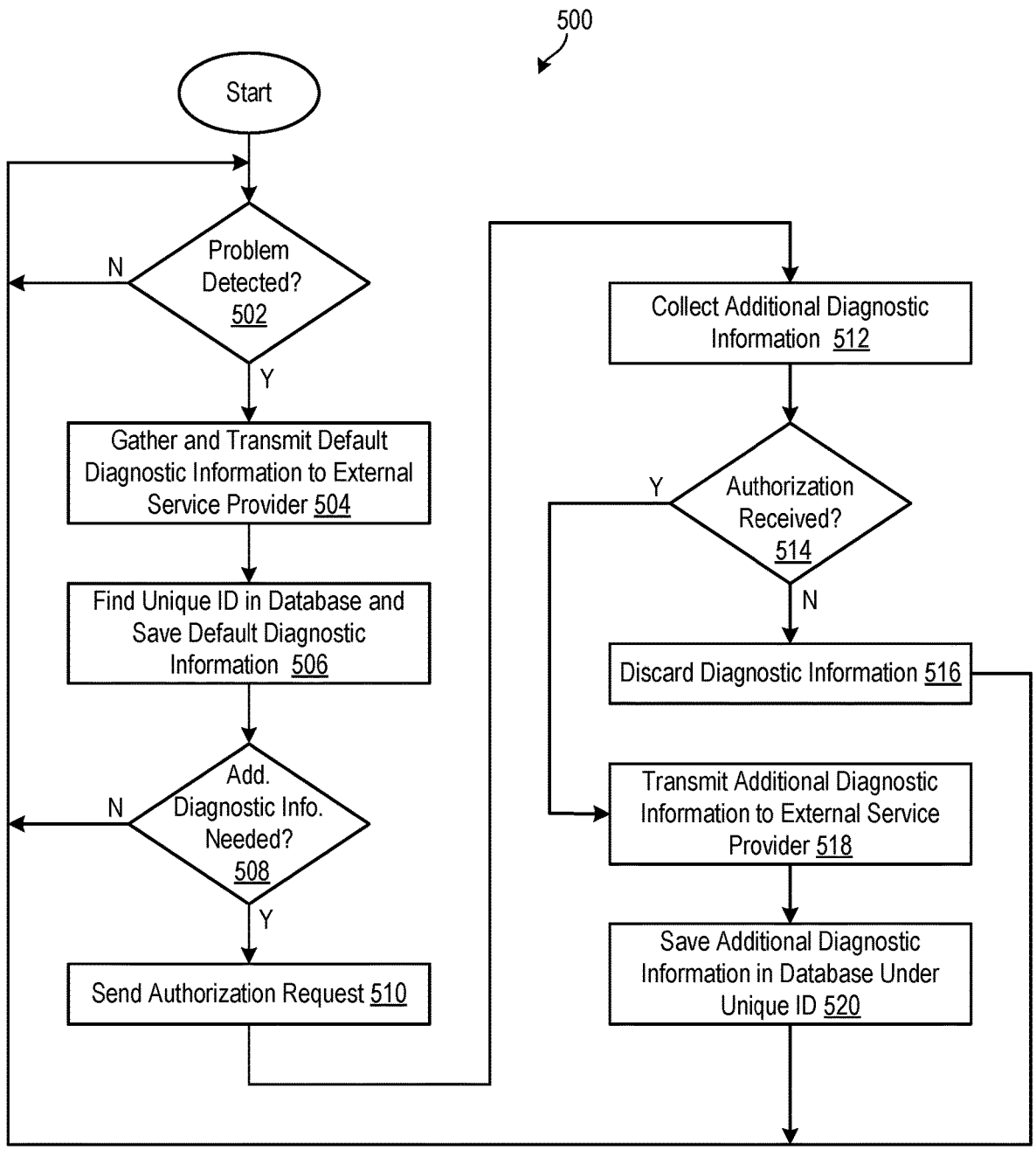
FIG. 5 is a process flow diagram showing a method for securely collecting diagnostic information at the time of detecting a problem.
Figure 6:
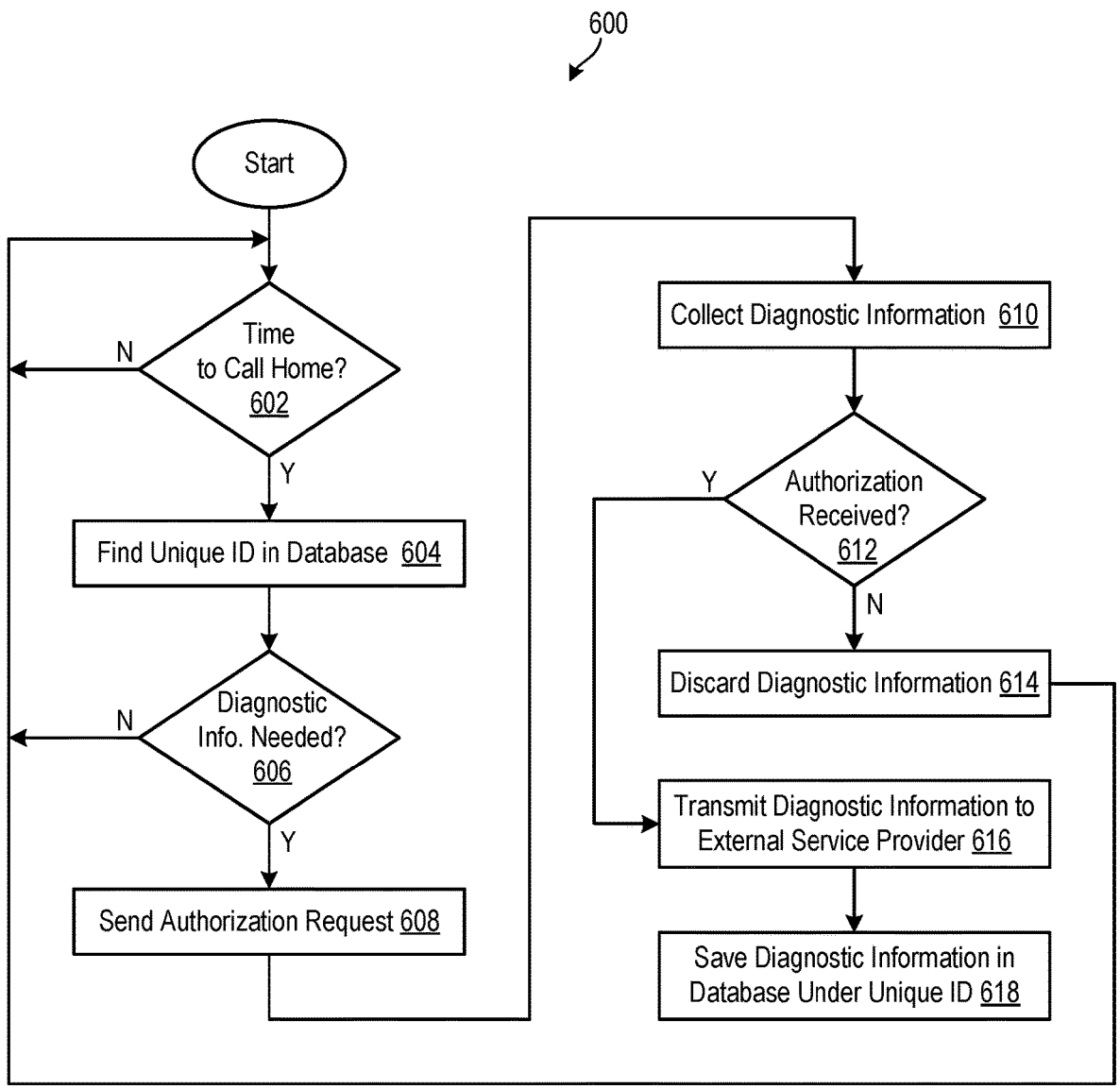
FIG. 6 is a process flow diagram showing a method for securely collecting diagnostic information at the time of conducting a periodic Call Home operation.

Referring to FIGS. 5 and 6, several methods 500, 600 are presented for securely collecting diagnostic information from an IT product 200. FIG. 5 is a process flow diagram showing a method 500 for securely collecting diagnostic information at the time of detecting a problem or issue on an IT product 200. FIG. 6 is a process flow diagram showing a method 600 for securely collecting diagnostic information at the time of conducting a periodic Call Home operation to an external service provider 202. In certain embodiments, an IT product 200 may be configured to execute one or both of the methods 500, 600.

As shown in FIG. 5, an IT product 200 may initially determine 502 whether a problem or issue has occurred on the IT product 200. If so, the IT product 200 gathers 504 a set of default diagnostic information and transmits 504 the information to an external service provider 202. This default diagnostic information may be saved 506 in a database 204 of the external service provider 202. The IT product 200 also finds 506 its unique identifier in the database 204 and determines 508 whether additional diagnostic information is requested for the IT product 200. This may include determining which additional diagnostic information needs to be collected for the IT product 200 in general, or which diagnostic information needs to be collected for the specific problem or issue that was detected on the IT product 200.

If, at step 508, additional diagnostic information is needed, the IT product 200 sends 510 an authorization request to an administrator 206 of the IT product 200 and collects 512 the additional diagnostic information. Immediately collecting the diagnostic information user 212 upon detecting a problem or issue may provide information that is in close temporal proximity and ideally more relevant to the problem or issue. The IT product 200 may then determine 514 whether authorization has been received from the administrator 206. If so, the IT product 200 transmits 518 the additional diagnostic information to the external service provider 202 and saves 520 the additional diagnostic information in the database 204 under the unique identifier associated with the IT product 200. If, at step 514, authorization is not received, the IT product 200 may discard 516 or not transmit the additional diagnostic information to the external service provider 202.

Referring to FIG. 6, in certain cases, an IT product 200 may be configured to perform a periodic Call Home to an external service provider 202 regardless of whether a problem or issue is detected on the IT product 200. During this routine Call Home, the IT product 200 may check whether additional diagnostic information has been requested by an external service provider 202.

As shown, the IT product 200 initially determines 602 whether it is time to perform a Call Home operation. For example, a Call Home operation may be performed every fifteen minutes. If it is time, the IT product 200 initiates the Call Home operation. During the Call Home operation, the IT product 200 finds 604 its unique identifier in the database 204 of the external service provider 202 and determines 606 whether the external service provider 202 has requested diagnostic information for the IT product 200. If so, the IT product 200 sends 608 an authorization request to an administrator 206 of the IT product 200. The IT product 200 also collects 610 the additional diagnostic information. If, at step 612, authorization is received, the IT product 200 transmits 616 the diagnostic information to the external service provider 202 and saves 618 the diagnostic information in the database 204 under the unique identifier associated with the IT product 200. If authorization is not received, the IT product 200 discards 614 or does not transmit the diagnostic information to the external service provider 202.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for securely collecting diagnostic information from an IT product, the method comprising:
    contacting, by an IT product, an external service provider having a database associated therewith, wherein the external service provider and database are located remotely from the IT product;

checking, by the IT product using outbound communication from the IT product to the external service provider, the database to determine if diagnostic information associated with the IT product needs to be collected on the IT product in order to diagnose a problem with the IT product;

if diagnostic information needs to be collected, sending, by the IT product, an authorization request to an administrator of the IT product; and if the authorization request is approved, collecting, by the IT product, the diagnostic information and transmitting the diagnostic information from the IT product to the external service provider.

2. The method of claim 1, wherein contacting the external service provider comprises contacting the external service provider in response to detecting a problem with the IT product.

3. The method of claim 1, wherein contacting the external service provider comprises delivering default diagnostic information to the external service provider.

4. The method of claim 1, wherein the diagnostic information is log information.

5. The method of claim 1, wherein the database identifies the diagnostic information that needs to be collected for the IT product.

6. The method of claim 1, wherein collecting the diagnostic information comprises collecting the diagnostic information prior to approval of the authorization request.

7. The method of claim 1, wherein transmitting the diagnostic information to the external service provider further comprises saving the diagnostic information in the database of the external service provider.

8. A computer program product for securely collecting diagnostic information from an IT product, the computer program product comprising a non-transitory computer-readable storage medium having computer-usable program code embodied therein, the computer-usable program code configured to perform the following when executed by at least one processor:

contact, by an IT product, an external service provider having a database associated therewith, wherein the external service provider and database are located remotely from the IT product;

check, by the IT product using outbound communication from the IT product to the external service provider, the database to determine if diagnostic information associated with the IT product needs to be collected on the IT product in order to diagnose a problem with the IT product;

if diagnostic information needs to be collected, send, by the IT product, an authorization request to an administrator of the IT product; and if the authorization request is approved, collect, by the IT product, the diagnostic information and transmit the diagnostic information from the IT product to the external service provider.

9. The computer program product of claim 8, wherein contacting the external service provider comprises contacting the external service provider in response to detecting a problem with the IT product.

10. The computer program product of claim 8, wherein contacting the external service provider comprises delivering default diagnostic information to the external service provider.

11. The computer program product of claim 8, wherein the diagnostic information is log information.

12. The computer program product of claim 8, wherein the database identifies the diagnostic information that needs to be collected for the IT product.

13. The computer program product of claim 8, wherein collecting the diagnostic information comprises collecting the diagnostic information prior to approval of the authorization request.

14. The computer program product of claim 8, wherein transmitting the diagnostic information to the external service provider further comprises saving the diagnostic information in the database of the external service provider.

15. A system for securely collecting diagnostic information from an IT product, the system comprising:

at least one processor;

at least one memory device operably coupled to the at least one processor and storing instructions for execution on the at least one processor, the instructions causing the at least one processor to:

contact, by an IT product, an external service provider having a database associated therewith, wherein the external service provider and database are located remotely from the IT product;

check, by the IT product using outbound communication from the IT product to the external service provider, the database to determine if diagnostic information associated with the IT product needs to be collected on the IT product in order to diagnose a problem with the IT product;

if diagnostic information needs to be collected, send, by the IT product, an authorization request to an administrator of the IT product; and if the authorization request is approved, collect, by the IT product, the diagnostic information and transmit the diagnostic information from the IT product to the external service provider.

16. The system of claim 15, wherein contacting the external service provider comprises contacting the external service provider in response to detecting a problem with the IT product.

17. The system of claim 15, wherein contacting the external service provider comprises delivering default diagnostic information to the external service provider.

18. The system of claim 15, wherein the database identifies the diagnostic information that needs to be collected for the IT product.

19. The system of claim 15, wherein collecting the diagnostic information comprises collecting the diagnostic information prior to approval of the authorization request.

20. The system of claim 15, wherein transmitting the diagnostic information to the external service provider further comprises saving the diagnostic information in the database of the external service provider.

* * * * *